United States Patent Office 3,822,341
Patented July 2, 1974

3,822,341
METHOD OF PRODUCING SULFUR FROM
ACID GASES
Robert Sherwood Smith, Houston, Tex., assignor to
Virgil H. Marsh, Silver Spring, Md.
Filed Sept. 1, 1972, Ser. No. 285,662
Int. Cl. C01b 17/04
U.S. Cl. 423—574
8 Claims

ABSTRACT OF THE DISCLOSURE

A process for producing sulfur from a gas containing a large amount of hydrogen sulfide. The process involves reacting oxygen and hydrogen sulfide with cooling so that the effluent therefrom is at a temperature between 550° to 650° F. Those reaction gases are reacted in a Claus reactor. The effluent gases leave at a temperature between 600° and 750° F. Liquid sulfur is removed from the gases by lowering the temperature of the gases to 270° to 320° F. in a condenser. The gases are further treated in a liquid-vapor contactor by means of chilled water, whereby the water vapor in the gases is removed. The temperature of the gases is raised to 425° to 500° F. by using the hot gases entering the above condenser as the heating means. The heated gases are subjected to reaction in a Claus reactor. Liquid sulfur is removed from the effluent gases by lowering the temperature of the gases to 270° C. to 320° F. in a condenser.

Figure 1:
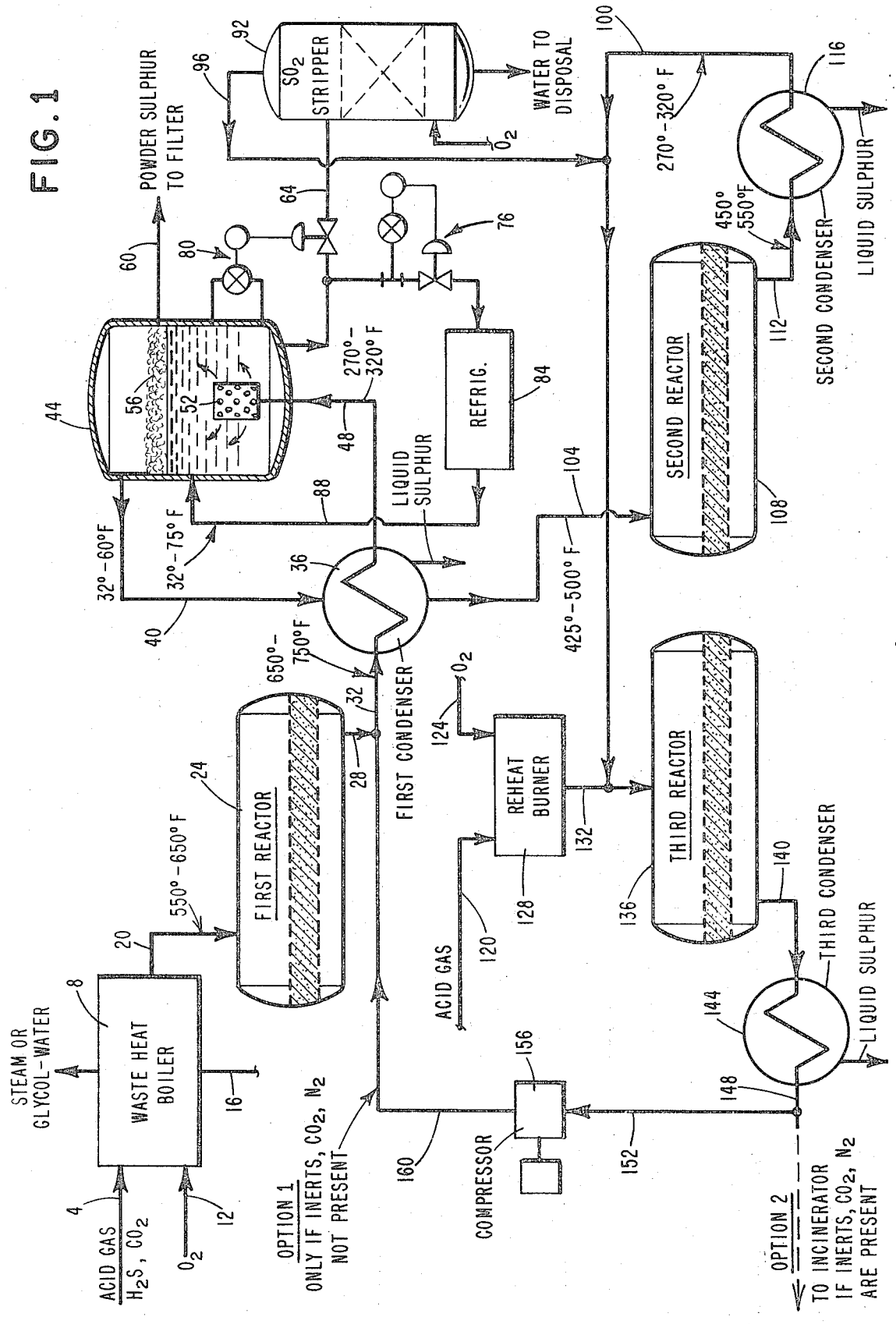

The cooled effluent gases can be admixed with the reaction gases from a reaction of oxygen and a gas rich in hydrogen sulfide. That admixture is then subjected to reaction in a Claus reactor, and liquid sulfur is removed from the effluent gases by lowering the temperature of the effluent gases to 270° to 320° F. in a condenser. A portion of the cooled effluent gas leaving the last condenser can be admixed with the reaction gases entering the first Claus reactor.

BACKGROUND OF THIS INVENTION (1) Field of This Invention

This invention relates to the production of elemental sulfur from "acid gas" and other similar gases containing hydrogen sulfide.

(2) Prior Art

U.S. Pat. No. 1,915,364 discloses combusting $H_2S$ and air and contacting the reaction gas with water to form an aqueous sulfur dioxide solution. The $SO_2$ solution is passed to a reaction zone and the $H_2S$-rich reaction gas is passed through the $SO_2$ solution. The solution is removed and the resultant sulfur is separated from the water.

U.S. Pat. No. 1,922,872 discloses admixing air (or oxygen or sulfur dioxide) with natural gas containing hydrogen sulfide, preheating the gaseous admixture in a heat exchanger to a temperature below 275° C. and passing the gaseous admixture into a catalyst chamber containing an iron oxide-promoted, activated bauxite catalyst. The reaction gases are then used in the heat exchanger to heat the gaseous admixture before the reaction gases are sent to a cooler to recover the formed sulfur.

U.S. Pat. No. 2,021,865, at page 2, col. 2, lines 12 to 18, discloses recovering sulfur from an aqueous sulfur suspension by settling, centrifuging or filtering.

U.S. Pat. No. 2,200,928 teaches the use of a catalyst in Claus reactors (120° to 450° C.) which absorbs some of the water formed by the subject reaction. This is stated to displace the equilibrium of the subject reaction to the right, thereby achieving higher conversion rates. The catalysts of this patent are stated to be capable of successively taking up and giving off the water at the subject temperature.

U.S. Pat. No. 2,258,305 discloses injecting air and a gas containing hydrogen sulfide into an internal combustion engine and partially combusting the hydrogen sulfide to form a gas containing $SO_2$, $N_2$, S, $H_2S$ and water. The exhaust gas is cooled so that the sulfur condenses out. The exhaust is further cooled to about atmospheric temperature to condense out the water. The exhaust gas is then heated to a temperature at which the $H_2S$ and $SO_2$ react to form sulfur (about 500° F. or higher). The sulfur is recovered by cooling the gas. At col. 2, last eight lines, of page 1, it is stated that the exhaust gases can be catalyzed, with or without first adjusting its hydrogen sulfide, sulfur dioxide and oxygen content, to further decompose the $H_2S$ to liberate sulfur by reaction with $SO_2$ or oxygen.

U.S. Pat. No. 2,298,641 teaches a process for the removal of hydrogen sulfide from gaseous hydrocarbons. The upper level of $H_2S$ in the gaseous hydrocarbons treated in that patent is 6000 grains of $H_2S$ per 100 cubic feet of gaseous hydrocarbons (or 10 percent by volume of $H_2S$). For support of this upper level, see page 2, column 1, lines 18 to 20, and page 1, column 1, lines 7 to 12. That patent does not teach the removal of $H_2S$ from a gaseous feed which even resembles an "acid gas." (Furthermore, U.S. Pat. 2,958,586, at col. 2, lines 33 to 37 and lines 49 to 54, teaches that unless the hydrocarbon level in $H_2S$ rich is kept to less than 10 volume percent, undesirable side reaction forming COS and/or $CS_2$ readily occur when the $H_2S$ rich gas is treated with air. This shows that there appears to be serious disadvantage with the process of U.S. Pat. N. 2,298,641 because it involves the treatment of a gas containing essentially 90 percent or more or hydrocarbons.)

To maximize the production of sulfur that patent teaches using essentially dry feed gas, and incorporates a drying agent in the catalyst bed. Another scheme for removing water involves the use of two catalyst chambers. The feed gas (e.g., natural gas) containing a small amount of $H_2S$ is admixed with oxygen and the admixture is heated and passed into the first catalyst chamber. The effluent is cooled to remove the sulfur and is then further cooled to remove water. The effluent with the proper amount of air (this is not air added at this point see col. 2 of page 3) is heated and passed into the second catalyst chamber, and sulfur is recovered from the reaction gases. A 98 percent removal of sulfur is reported.

U.S. Pat. No. 2,384,926 teaches recycling part of the effluent from a sulfur condenser to the feed line for a catalytic reactor (which is associated with the sulfur condenser).

U.S. Pat. No. 2,403,451 teaches partly combusting a mixture of air and hydrogen sulfide, and cooling the reaction gases by heat exchange with the feed mixture gas. The reaction gases are passed into contact material having a large surface area, cooled and liquid sulfur is separated. More gas containing $H_2S$ is added to the reaction gases and are passed over an oxidation catalyst. More sulfur is removed. Then the reaction gas is scrubbed with molten sulfur and passed through a water spray.

U.S. Pat. No. 2,958,586 discloses heating reaction gas after sulfur is condensed out by means of air and fuel gas before it is passed to a second conversion zone (catalyst chamber). Sulfur is condensed from the reaction gas leaving the second conversion zone, and then the reaction gas is scrubbed with liquid sulfur to remove any sulfur vapor. The presence of moisture in the feed gases is stated to be known to be undesirable as it suppresses the formation of sulfur and its removal from the feed gases is taught.

U.S. Pat. No. 3,407,040 burns air and acid gas (or sour gas) in a furnace to produce a mixture containing sulfur dioxide, sulfur and hydrogen sulfide, and condenses out liquid sulfur. A portion of the reaction gases are blended with air (and minor amounts of oxygen, if desired) oxidized in a catalytic reactor. That gas is added to the untreated portion of the reaction gas to adjust the temperature of the resultant admixture to a proper temperature for the catalytic reaction of $H_2S$ and $SO_2$, and then the admixture is passed to a catalytic reactor.

BROAD DESCRIPTION OF THIS INVENTION

This invention involves what might broadly be termed a two stage reaction. The course of the reaction corresponds to the following equations:

(I)  $\quad\quad\quad 2H_2S + 3O_2 = 2SO_2 + 2H_2O$ (II) $\quad\quad\quad SO_2 + 2H_2S = 3S + 2H_2O$ The advantage of working in this manner as contrasted with the method of working as indicated by the following equation:

(III) $\quad\quad\quad 2H_2S + O_2 = 2S + 2H_2O$ consists in the fact that the Reaction III which is attended by great evolution of heat is split into two reactions of which that according to Equation I proceeds with evolution of large amounts of heat while the reaction according to Equation II only yields small amount of heat. The amount of heat produced in the first stage (Reaction I) may be readily utilized, as for example for the production of steam, and thus withdrawn, while the amount of heat produced by Reaction II is sufficiently great to maintain the optimum temperature during the production of sulfur without undesirable increase in temperature taking place. (Along these lines see U.S. Pat. No. 2,092,386.)

The so-called first stage (Reaction II) involves reacting part of the hydrogen sulfide to form sulfur dioxide; and the so-called second stage involves reacting, in the presence of a catalyst, the sulphur dioxide with the remaining hydrogen sulfide to form sulfur. It is important to have $H_2S$ and $SO_2$ present in a molar ratio of 2 to 1 in Reaction II (Claus reaction step). This further means that only about one third of the initial $H_2S$ should be converted to $SO_2$ in Reaction I (e.g., one volume of oxygen and two volumes of $H_2S$ are used in the feed gases).

This invention involves a process for producing sulfur from a gas containing a large amount of hydrogen sulfide. The process includes reacting oxygen, and hydrogen sulfide with cooling such that the effluent therefrom is at a temperature between 550° to 650° F. The reaction gases are reacted in a Claus reactor. As an alternative, any gas containing about the requisite amounts of $H_2S$ and $SO_2$ and in that temperature range can be used as feed to the Claus reactor. The reaction gases exit at a temperature between 600° and 750° F. Liquid sulfur is removed from reaction gases from lowering the temperature of the reaction gases to 250° to 320° F. in a condenser. The reaction gases are cooled in a liquid-vapor contactor by means of chilled water whereby the water vapor in the reaction gases is removed. The temperature of reaction gases is raised to 425 to 500° F. by using the hot reaction gases leaving the above Claus reactor as the heating medium in the condenser. The reaction gases are subjected to reaction in a Claus reactor. Liquid sulfur is removed from the reaction gases by lowering the temperature of reaction gases to 250° to 320° F. in a condenser.

The reaction gases then can be admixed with the reaction gases from a reaction of oxygen and a gas rich in hydrogen sulfide (e.g., from a heat burner). The admixture is reacted in a Claus reactor. Liquid sulfur is removed from the admixture by lowering the temperature of the admixture to 250° to 320° F. in a condenser, If oxygen was used, a portion of the admixture leaving the last recited condenser can be admixed with the reaction gases leaving the last recited condenser admixed with the reaction gases leaving the first mentioned Claus reactor. Gases such as air can be used as the source of oxygen in this invention.

The water leaving the liquid-vapor contactor can be passed through an $SO_2$-stripper, using oxygen. The $SO_2$ rich gas can then be fed into a Claus reactor along with the other feed gases.

The process of this invention does not use any chemicals to remove the water from the reaction gases. A "sour" water is the only byproduct, and it can be recycled back to refinery hydrotreater effluent coolers as washdown or stripped with air and the gas recycled to the waste heat boiler. The process of this invention is a continuous process, whereas processes which use adsorbent beds are batch processes. Also, the process of this invention requires a relatively low capital investment, maintenance and labor costs.

The term "acid gas," as used herein and as is conventional in the art, contains principally hydrogen sulfide or principally hydrogen sulfide and carbon dioxide. A minor amount of inert gases, such as, nitrogen, can be present. The problem with carbon dioxide nitrogen and other inert gases is explained below.

The acid gas should contain at least 15 mole percent of hydrogen sulfide, and preferably at least 25 mole percent of hydrogen sulfide. Gases containing 90 percent or more of hydrogen sulfide are particularly suited for the process of this invention. Most preferably the acid gas contains less than 5 volume percent of inert gases, such as, carbon dioxide and nitrogen. The acid gas should contain less than 9 volume percent of hydrocarbons and preferably less than two volume percent of hydrocarbons. This hydrocarbon concentration can be maintained by proper refluxing and reboiling, or by utilizing several stages of adsorption, absorption and/or stripping. The unsaturated hydrocarbons can be removed, or their level reduced, before being used in the process of this invention by fractionation, polymerization or any other convenient method. A high hydrocarbon content causes catalyst fouling and dark sulfur and requires an excessive amount of combustion air or oxygen (in the initial non-catalytic furnace or burner). But maintaining the hydrocarbon concentration in the gas entering the $SO_2$-production (oxidation) zones at the specified value, side reactions, such as, those resulting in the formation of COS and/or $CS_2$, are mimized or prevented and the overall yield of elemental sulfur from the $H_2S$-$SO_2$ reaction is increased.

Acid gases are normally the gases or effluents recovered from natural gas sweetening units and refinery desulfurization units, but can be any gas meeting the above-defined parameters (when used as a feed in the process of this invention).

One of the novel points of this invention is the removal of water from the effluent coming from a condenser before the effluent is fed to the next Claus reactor. When several reactors are used in series, the water can be removed the reaction gas (effluent) between any pair of reactors or between all of the reactors. The water is removed preferably by cooling means, such as, continuously be means of a chilled liquid-vapor contactor, because that is the most efficient method. The removal of water by means such as cooling greatly aids the stoichiometry of the reaction, creating thereby higher conversion efficiencies in subsequent reactors.

A sulfur recovery of about 99.2 percent is possible when a four reactor system is used, the gas fed into the first reactor contains 80 percent hydrogen sulfide and the water is removed by cooling to 75° F. in a liquid-vapor contactor. A sulfur recovery of about 99.8 percent is possible under the same set of conditions if the cooling is done to 32° F. U.S. Pat. No. 3,108,855, at col. 5, lines 43 to 53, discloses a conversion to sulfur of 93 percent based on the hydrogen sulfide charge (for a particular system). Such percentages of removal of hydrogen sulfide are not sufficient in these days of increasing polution and environmental control.

Another novel point of this invention is enrichment of the feed gas to the third and/or any and/or all of the subsequent Claus reactors (in the series) with air or oxygen, which forces the reaction to a high degree of completion.

Each of the stated and unstated novel points of this invention are important to the process, but applicant has unexpectedly found that very superior results are found when all such novel points are used in applicant's process.

DETAILED DESCRIPTION OF THIS INVENTION

Figure 2:
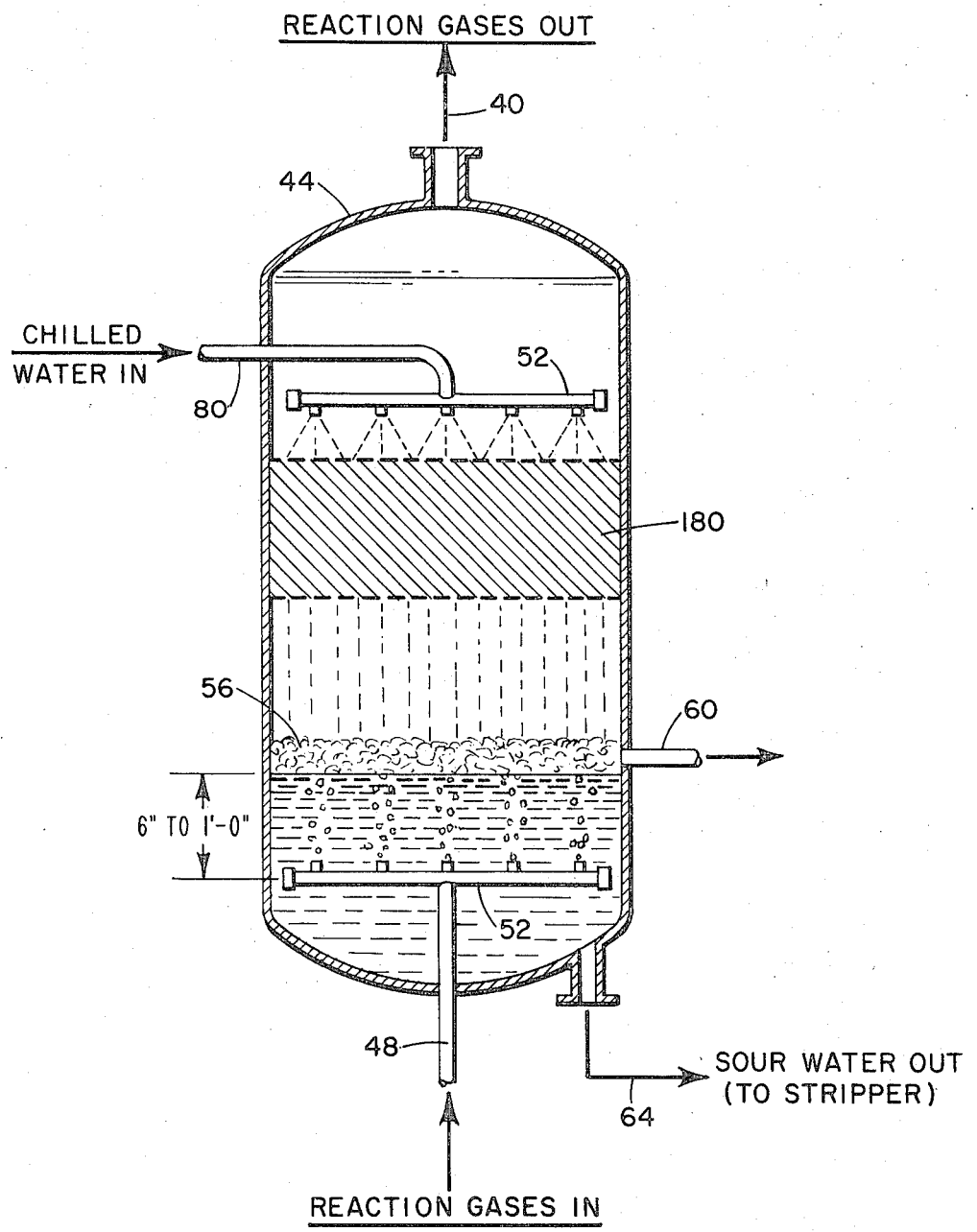

In the drawings:

FIG. 1 is a schematic diagram that illustrates one embodiment of this invention, and FIG. 2 illustrates a useful liquid-vapor contactor.

Process line 4 feeds acid gas or some similar type of gas containing hydrogen sulfide and possibly $CO_2$ into waste heat boiler 8; process line 12 feed oxygen, air, oxygen-enriched air, or some type of inert makeup gas containing large amounts of oxygen into waste heat boiler 8; the two gas streams are admixed in waste heat boiler 8. Water (16), glycol-water or some similar type of fluid is used in waste heat boiler 8 to lower the temperature of the reaction so that the existing effluent has a temperature of about 550° to 650° F. The heated gas admixture is passed via line 20 into the first reactor 24. The first reactor is a conventional Claus reactor which contains bauxite and, if necessary, a Co-Mo catalyst. A stoichiometric conversion of hydrogen sulfide to sulfur of about 75 percent is achieved at the discharge temperature.

The reaction gases leave the first reactor 24 via line 28 at a temperature of 600° to 750° F.

Recycle gases from line 32 can be admixed with the reaction gases at this point. The reaction gases are passed through first condenser 36 (usually countercurrents) and reduced in temperature to 270° to 320° F. by means of the cool gases in process line 40. Liquid sulfur is obtained (condensed) from the reaction gases cooled in the first condenser 36, and removed to a storage site. The reaction gases (effluent) pass from the first condenser 36 into the liquid vapor contactor 44 via line 48, and are passed out, under pressure, of nozzle or sparger 52, forming a series of small well-disbursed gas streams. Chilled water (32 to 75° F.) is sprayed down onto the reaction gases with or without an intermediate packed distribution bed, the water eminating from a nozzle or sparger similar to 52. FIG. 2 shows packed distribution bed 180, which is about 4 feet thick and is packed with 2 inch saddles. Any remaining vaporized elemental sulphur is now in the form of a small layer of froth 56 which is removed to a filter via nozzle 60, under pressure or with the aid of an internal rotating device, powdered sulphur being recovered in the filter. (The water height between sparger 52, releasing the small gas streams, and froth layer 56 is normally 6 inches to one foot.) The chilled water spray also removes most of the water vapor in the reaction gases. This removal is a predictable function of chilled water inlet temperature and circulation rate. Liquid water from liquid vapor contactor 44 is removed via line 64 and cycled via line 68 or 72, as guided by control valve means 76 and 80, respectively. Some of the water is passed via line 68 into refrigerator 84 wherein it is chilled to 32 to 75° F., and passed via line 88 to the inlet of liquid vapor contactor 44, where it is sprayed therein as described above. Some of the water is passed via line 72 into $SO_2$ stripper 92, wherein oxygen or air is passed upwards through it. The stripped water is sent to disposal and the $SO_2$ containing stream is removed via line 96 and admixed with the reaction gas in line 100 or, alternatively, recycled to the Waste Heat Boiler, being admixed with line 12.

The reaction gases are chilled in the liquid-vapor contactor 44 to 32° to 60° F., and passed via line 40 to first condenser 36 wherein they are heated to a temperature of 425° to 500° F. by the hotter reaction gases which have not yet been processed through contactor 44. The heated reaction gases are passed via line 104 to the second reactor 108, which is a conventional Claus reactor which contains bauxite and, if necessary a Co-Mo catalyst. The reaction gases leave the second reactor 108 via line 112 at a temperature of 450° to 550° F., are passed to the second condenser 116 and leave the second chamber 116 via line 100 at a temperature of 270° to 320° F. Liquid sulfur is obtained (condensed) from the reaction gases, cooled in the second condenser 116, and removed to a storage site.

The reaction gases in line 100 are admixed with the $SO_2$-containing oxygen stream in line 96. Acid gas, and oxygen are fed via lines 120 and 124, respectively, into re-heat burner 128, and the reaction gases therefrom are passed via line 132 to line 100 where they are admixed with the reaction gases in line 100. The temperature of the admixtures of gases is 425° to 500° F. The admixture of gases is then passed into the third reactor 136, which is a conventional Claus reactor which contains bauxite and, if necessary, a Co-Mo catalyst. The reaction gases leave the third reactor 136 via line 140, are passed to the third condenser 144 and leave the third condenser 144 at a temperature of 270° to 320° F. Liquid sulfur is obtained (condensed) from the reaction gases cooled in the third condenser 144, and removed to a storage site.

The spent reaction gases leave the third condenser 144 via line 148. If the spent reaction gases contain inert gases, such as, $CO_2$ and $N_2$, it is sent to an incinerator, or treated, used or disposed of in any convenient manner. If the spent reaction gases do not contain inert gases, such as, $CO_2$ and $N_2$, it is passed via line 152 to compressor 156 and then via line 152 to compressor 156 and then via line 160 to be admixed with the reaction gases in line 28.

In northern places where low ambient temperatures are usually available, refrigerator 84 can be an air cooled fin-fan (or air cooled heat exchanger) and a pump.

Instead of using oxygen in the $SO_2$ strippers and in the burners, air can be used. Air is less expensive than oxygen, but oxygen is preferred because it does not introduce large amounts of inert gases, such as, nitrogen, into the system. Furthermore, the use of oxygen allows greater monetary savings in capital equipment.

When oxygen is used, the temperature of the feed gases entering the burners should be lowered.

The Claus reactors normally contain a catalyst, such as, bauxite (e.g., British Guiana bauxite) bog iron ore, active carbon, active silica gel, alumina, alumina cement, alumina on which heavy metal oxides have been precipitated, and other substances having large superficial areas. Any suitable catalyst can be used in the Claus reactors which promotes the interaction of hydrogen sulfide with sulfur dioxide. The porous silicic acid (activated silica gel) of U.S. Pat. No. 1,507,105 can be used. The activated bauxite of U.S. Pat. No. 1,773,293 can be used. The iron-oxide-promoted, activated natural bauxites of U.S. Pat. No. 1,992,872 can be used. U.S. Pat. No. 2,384,926 teaches useful catalysts which include silica gel to which have been added minor amounts of oxides of boron, sodium or potassium.

When using gases low in hydrogen sulfide content, the reaction in Claus reactors can be speeded up by adding a small quantity of a base such as ammonia or an amine.

Typical space velocities for the Claus reactors are from about 2 to about 15 pound moles of feed gas per cubic foot of catalyst employed.

Any type of Claus reactor can be used.

If carbon disulfide or carbonyl sulfide is present in the feed gas, an additional layer of a catalyst, such as, a cobalt-molybdenum catalyst, is used.

The process is most preferably achieved using three reactors in series, but it is advantageous to use four reactors in series. The process envisions the use of two or more reactors in series.

The process of this invention is conducted at pressures of about atmospheric to about 5 atmospheres. The higher pressures are preferred because they aid in the conversion efficiency of the Claus reaction.

Sulfur is removed from the reaction gases after each Claus reactor because it allows the use of lower reactor feed temperatures in subsequent Claus reactors, which improves yields without incurring catalyst deactivation by sulfur condensation.

It should be noted that for the recoveries indicated in the region on 98 percent recovery and greater, the vapor pressure of $S_6$ and $S_8$ contribute an equal or greater portion of sulfur for incinerated $SO_2$ as do the unreacted $H_2S$ and $SO_2$. The final condenser should be run at 250° to 280° F., instead of at a higher temperature in order to achieve minimum emissions.

The sulfur condensers are operated so that they cool the reaction gases to about 250° to 320° F. This produces a liquid form of the sulfur which is relatively non-viscous. That temperature is above a point that the water vapor present does not condense to water. Sulfur species $S_2$, $S_6$ and $S_8$ are formed in Reaction II.

The bulk of reaction water, after the sulfur condensation step, is removed by condensation cooling in a direct contact vessel. A small amount of $S_6$ and $S_8$ are produced and removed by a small filter. Sour water is circulated through the vessel to allow the effluent gas to be cooled to a low water dew point. Net sour water from this vessel may be disposed in several ways. In a refinery, the sour water can be used in the sour water system to wash and quench hydrotreater effluent exchangers. Alternatively, the small amount of dissolved $H_2S$ and $SO_2$ can be stripped with air in a packed column and the gas recycled to the waste heat boiler inlet. After stripping this water could be disposed or reused elsewhere in the plant.

Another embodiment of the process of this invention uses three Claus reactors. Acid gas and air (or oxygen) are reacted in a waste heat boiler. Sulfur (liquid) is removed from the reaction gases in a first condenser. The reaction gases are heated by admixture with reaction gases from a reheat burner (using air or oxygen and acid gases), and the admixture is fed into a first Claus reactor. The reaction gases are passed through a second condenser wherein sulfur (liquid) is removed. The reaction gases are heated by admixture with reaction gases from a reheat burner (using air or oxygen and acid gases), and the admixture is fed into a second Claus reactor. The reaction gases are passed through a third condenser wherein sulfur (liquid) is removed. The reaction gases are heated by admixture with reaction gases from a reheat burner (using air or oxygen and acid gases), and the admixture is fed into a third Claus reactor. The above is a conventional operation and all of the operating conditions are well known to those ordinarily skilled in the art.

The reaction gases from the third Claus reactor is passed through a fourth condenser whereby sulfur (liquid) is removed and the reaction gases are cooled to 250° to 280° F. The reaction gases are then passed into a liquid-vapor contactor such as 44 where the reaction gases are cooled at 40° to 140° F. A chilled water spray in the liquid-vapor contactor removes the bulk of the water vapor in the reactor gases. Also, any remaining vaporized elemental sulfur is removed as a froth to a filter. The recycle of the water and the entire operation of the liquid-vapor contactor is explained in more detail above. The cooled reaction gases are heated to 425° to 475° F. by their use as the cooling medium in the fourth condenser. The reaction gases are fed to a fourth Claus reactor. The reaction gases are passed through a fifth condenser wherein sulfur (liquid) is removed and the reaction gases are cooled to 250° to 280° F. The reaction gases can be passed to an incinerator, but, if oxygen, was used, part of the reaction gas can be recycled to any Claus reactor or condenser.

One, two, or any number of Claus reactors can be used in place of the three Claus reactors in the conventional portion of the above embodiment of this invention.

What is claimed is:
1. A process for producing sulfur from a gas containing a large amount of hydrogen sulfide which comprises:
   (a) reacting oxygen and hydrogen sulfide, the admixture thereof containing at least 9 mole percent of hydrogen sulfide and not more than 9 volume percent of hydrocarbons, at a temperature such that the effluent thereof is at a temperature between 550° to 650° F.,
   (b) subjecting the reaction gases from (a) to reaction in a Claus reactor, the reaction gases exiting therefrom being at a temperature between 600° and 750° F.,
   (c) removing liquid sulfur from the reaction gases from (b) by lowering the temperature of reaction gases (b) to 250° to 320° F. in a condenser,
   (d) treating the reaction gases from (c) in a liquid-vapor contactor by means of chilled water to a temperature between 32° and 75° F., whereby the water vapor in the reaction gases (c) is removed by condensation,
   (e) raising the temperature of reaction gases from (d) to 425° to 500° F. by using reaction gases from (b) as the heating medium in the condenser in step (c),
   (f) subjecting the reaction gases from (e) to reaction in a Claus reactor,
   (g) removing liquid sulfur from the reaction gases from (f) by lowering the temperature of reaction gases (f) to 250° to 320° F. in a condenser,
   (h) admixing the reaction gases from (g) with the reaction gases from a reaction oxygen and a gas rich in hydrogen sulfide,
   (i) subjecting the reaction gases from (h) to reaction in a Claus reactor, and
   (j) removing liquid sulfur from the admixture of reaction gases from (i) by lowering the temperature of the admixture of reaction gases to 250° to 320° F. in a condenser,
at least a major part of the condensed water vapor that is removed in step (d) being passed through a stripper wherein oxygen reacts with any sulfur in the water to produce $SO_2$ which is fed into the gas stream after step (g).

2. A process as described in Claim 1 wherein air was used as the source of oxygen in all recited instances.

3. A process as described in Claim 1 wherein a portion of the admixture of reaction gas leaving the last recited condenser is admixed with the reaction gases between steps (b) and (c).

4. A process as described in Claim 1 wherein part of the condensed water vapor that is removed in step (d) becomes part of the water which is chilled and used in step (d).

5. A process as described in Claim 1 wherein the admixture of step (a) contains at least 25 mole percent of hydrogen sulfide.

6. A process as described in Claim 1 wherein air is used as the source of oxygen in step (a).

7. A process for producing sulfur from a gas containing large amounts of hydrogen sulfide and sulfur dioxide which comprises:
   (a) subjecting a containing sulfur dioxide, and at least 9 mole percent of hydrogen sulfide, at a temperature of 550° to 650° F., to reaction in a Claus reactor, the reaction gases eminating from the Claus reactor being at a temperature between 600° and 750° F.,
   (b) removing liquid sulfur from the reaction gases from (a) by lowering the temperature of reaction gases (a) to 250° to 320° F. in a condenser,
   (c) treating the reaction gases from (b) in a liquid-vapor contactor by means of chilled water to a temperature between 32° and 75° F., whereby the water vapor in the reaction gases (b) is removed by condensation,
(d) raising the temperature of reaction gases from (c) to 425° to 500° F. by using reaction gases from (a) as the heating medium in the condenser in step (b),
(e) subjecting the reaction gases from (d) to reaction in a Claus reactor,
(f) removing liquid sulfur from the reaction gases from (e) by lowering the temperature of reaction gases (f) to 250° to 320° F. in a condenser,
(g) admixing the reaction gases from (f) with the reaction gases from a reaction oxygen and a gas rich in hydrogen sulfide,
(h) subjecting the reaction gases from (g) to reaction in a Claus reactor, and
(i) removing liquid sulfur from the admixture of reaction gases from (h) by lowering the temperature of the admixture of reaction gases to 250° to 320° F. in a condensor at least a major part of the condensed water vapor that is removed in step (c) being passed through a stripper wherein oxygen reacts with any sulfur in the water to produce $SO_2$ which is fed into the gas stream after step (f).

8. A process as described in Claim 7 wherein the gas of step (a) contains at least 25 mole percent of hydrogen sulfide.

References Cited
UNITED STATES PATENTS

| | | | |
|---|---|---|---|
| 2,258,305 | 10/1941 | Stirlen | 423—574 |
| 2,298,641 | 10/1942 | Schulze et al. | 423—576 X |
| 2,497,095 | 2/1950 | Nevins et al. | 423—573 |
| 2,834,653 | 5/1958 | Fleming et al. | 423—576 |
| 2,889,207 | 6/1959 | Eliot | 423—574 |
| 2,413,714 | 6/1947 | Keeling | 423—576 |

GEORGE O. PETERS, Primary Examiner